United States Patent [19]
Chiba et al.

[11] Patent Number: 5,952,435
[45] Date of Patent: Sep. 14, 1999

[54] COMPOSITE MATERIAL, METHOD FOR PRODUCING THE SAME AND COMPOSITE MATERIAL FOR LATERAL RIGID MEMBER FOR TRACK BELT

[75] Inventors: Fumio Chiba, Hiratsuka; Yuichi Tanaka, Joetsu, both of Japan

[73] Assignee: The Yokohama Rubber Co., Ltd., Joetsu, Japan

[21] Appl. No.: 08/703,046

[22] Filed: Aug. 26, 1996

[30] Foreign Application Priority Data

Aug. 31, 1995 [JP] Japan .................................. 7-248436

[51] Int. Cl.[6] ........................... C08F 20/00; F02M 15/00
[52] U.S. Cl. .......................... 525/438; 525/437; 525/113; 525/115; 525/119; 525/396; 525/463; 264/137
[58] Field of Search ..................... 525/437, 438, 525/113, 115, 119, 396, 463; 264/137

[56] References Cited

U.S. PATENT DOCUMENTS

| | | | |
|---|---|---|---|
| 4,276,208 | 6/1981 | Ogawa et al. | 260/28 |
| 5,317,067 | 5/1994 | Yagi et al. | 63/2 |

FOREIGN PATENT DOCUMENTS

| | | | |
|---|---|---|---|
| 57-125245 | 8/1982 | Japan | C08L 63/00 |
| 57-174315 | 10/1982 | Japan | C08G 59/40 |
| 6-96632 | 11/1994 | Japan | C08G 59/50 |

OTHER PUBLICATIONS

Don, T–M., J.P. Bell and M. Narkis, "Toughening of Epoxy Resins by Polycarbonate", *ANTEC '95*, pp. 2651–2655.

Li, M–S., Y–S Li, C–C.M. Ma, Y–D. Wu and S–C. Chang, "The Mechanical and Thermal Properties of Polycarbonate Modified Epoxy", *ANTEC '95*, pp. 892–896.

*Primary Examiner*—Ardin H. Marschel
*Assistant Examiner*—Jezia Riley
*Attorney, Agent, or Firm*—Pollock, Vande Sande & Amernick

[57] ABSTRACT

A composite material for a lateral rigid member of a track belt for use in a snowmobile. A glycidylamine epoxy resin that is a polyfunctional epoxy thermosetting resin and has a molecular weight of about 250 to 1000 is included in an amount of 100 parts by weight. A 2-functional epoxy resin having a molecular weight of about 100 to 600 is included in an amount of 12 to 14.5 parts by weight. An aromatic polycarbonate thermoplastic resin having a molecular weight of about 12000 to 80000, a glass transition point of 130° C. or more, a melting point of 220° C. to 240° C. is included in an amount of 5 to 45 parts by weight. An acid anhydride curing agent is included in an amount of 90 to 130 parts by weight. The composite material also includes reinforcing fiber.

13 Claims, 8 Drawing Sheets

| items | example 1 matrix of polyfunctional epoxy + aromatic polycarbonate resin<br><br>polymer alloy article | example 2 matrix of polyfunctional epoxy + aromatic polycarbonate resin<br><br>polymer alloy article which is aromatic polycarbonate resin added to example 2 | example 3 matrix of polyfunctional epoxy + aromatic polycarbonate resin<br><br>polymer alloy article which is aromatic polycarbonate resin added to example 3 |
|---|---|---|---|
| matrix viscosity mpa·s | 920 | 1,240 | 1,620 |
| unit weight of article g/m | 130.5 | 130.7 | 131.0 |
| volume containing ratio of glass fiber % | 63.4 | 63.4 | 63.4 |
| volume containing ratio of matrix % | 36.6 | 36.6 | 36.6 |
| volume containing ratio of thermoplastic resin in matrix % | 7.51 | 7.46 | 9.51 |
| glass transition point (Tg point) °C | 203 | 208 | 209 |
| bending fatigue durable test (run number) 200kg to 100kg | 167,800 | 208,970 | 255,310 |

FIG. 1-(A)

| items | example 1 matrix of polyfunctional epoxy + aromatic polycarbonate resin<br><br>polymer alloy article | example 2 matrix of polyfunctional epoxy + aromatic polycarbonate resin<br><br>polymer alloy article which is aromatic polycarbonate resin added to example 2 | example 3 matrix of polyfunctional epoxy + aromatic polycarbonate resin<br><br>polymer alloy article which is aromatic polycarbonate resin added to example 3 |
|---|---|---|---|
| matrix viscosity mpa·s | 920 | 1,240 | 1,620 |
| unit weight of article g/m | 130.5 | 130.7 | 131.0 |
| volume containing ratio of glass fiber % | 63.4 | 63.4 | 63.4 |
| volume containing ratio of matrix % | 36.6 | 36.6 | 36.6 |
| volume containing ratio of thermoplastic resin in matrix % | 7.51 | 7.46 | 9.51 |
| glass transition point (Tg point) °C | 203 | 208 | 209 |
| bending fatigue durable test (run number) 200kg to 100kg | 167,800 | 208,970 | 255,310 |

F I G. 1-(B)

| items | comparison example 1 matrix of epoxy having conventional composition | comparison example 1 matrix of polyfunctional epoxy having conventional composition | comparison exmple 2 matrix of polyfunctional epoxy having conventional composition | comparison example 3 conventional type: polyfunctional epoxy + phenoxy resin<br><br>polymer alloy obtained adding phenoxy resin to comparison example 3 | comparison example 4 conventional type: polyfunctional epoxy + polyether ether ketone resin<br><br>polymer alloy obtained adding polyether ether ketone to comparison example 3 |
|---|---|---|---|---|---|
| matrix viscosity mpa·s | 650 | 1050 | 1,370 | 1,590 | 1,670 |
| unit weight of article g/m | 130.2 | 130.2 | 130.0 | 130.9 | 131.0 |
| volume containing ratio of glass fiber % | 63.4 | 63.4 | 63.4 | 63.4 | 63.4 |
| volume containing ratio of matrix % | 36.6 | 36.6 | 36.6 | 36.6 | 36.6 |
| volume containing ratio of thermoplastic resin in matrix % | — | — | — | 8.03 | 7.30 |
| glass transition point (Tg point) °C | 130 | 222 | 217 | 182 | 211 |
| bending fatigue durable test (run number) 200kg to 100kg | 58,710 | 28,080 | 32,420 | 83,900 | 24,370 |

COMPOSITE MATERIAL, METHOD FOR PRODUCING THE SAME AND COMPOSITE MATERIAL FOR LATERAL RIGID MEMBER FOR TRACK BELT

FIELD OF THE INVENTION

The present invention relates to a composite material for a lateral rigid member (hereinafter referred to as a "rod") of a track belt used in a snowmobile or the like. More particularly, the invention relates to a composite material for a rod of a high speed type machine or a large size type machine because the rod of the present invention for a rubber track belt is light weight, highly heat-resistant and has superior bending strength and bending fatigue characteristics.

BACKGROUND OF THE INVENTION

At first, the rod of a track belt of snowmobiles was made of steel material. However, the snowmobile has been widely and generally used as a vehicle in cold areas and extensively used for leisure. In accordance with these requirements, and also to meet the demand on the market to save the energy and to enhance performance, fiber reinforced plastics are now used.

Leisure use of snowmobiles has been recently emphasized more and more and larger and higher performance snowmobiles have been used. Accordingly, the conventional high velocity of snowmobiles in the range of 120 to 150 km/hr has to been increased to in the range of 160 to 200 km/hr.

As a result, for rods using conventional fiber reinforced plastics, there is a great fear that the rod with break when the snowmobile runs. It has been found that rods of conventional fiber reinforced plastics are not durable and, in addition experience seriously deteriorated safety.

According to analyses, it has been found that the reason for the above described problems is that the temperature of the fiber reinforced plastics is elevated up to a high temperature in the range of 180 to 200° C. due to mechanical friction caused by continuous high velocity running of the snowmobile. Heat generated by such running is retained by the rods. The temperature largely exceeds the glass transition point, typically about 130° C., of the fiber reinforced plastics.

Accordingly, it is necessary to provide a material for the rods, which, of course, has high bending fatigue characteristics in an environment including temperatures from room temperature to 80° C. experienced during routine running at less than 100 km/hr while maintaining high heat resistance at temperatures above 200° C. The rod material should also be durable against repeated bending loads randomly applied to the belt during running on convex and concave surfaces. In other words, the material should exhibit bending fatigue characteristics.

Almost all of the practical fiber reinforced plastics that have been used in the rods are made by plastic drawing and molding using unsaturated polyester resin, a vinyl ester resin or an epoxy system resin in a matrix.

However, although unsaturated polyester resin and vinyl ester resin are easy to handle and experience superior moldability, their heat resistance is limited to up to 150° C. They also exhibit generally inferior bondability to epoxy system resins. Accordingly, the unsaturated polyester resin and vinyl ester resin have a problem with bending fatigue characteristics.

On the other hand, the epoxy system resin is superior in bondability and has a wide variety of kinds. Also, epoxy resins have superior heat resistance. However, it is well known that, if heat durability is regarded as an important factor, the resin becomes hard and fragile, resulting in remarkable degradation in bending fatigue characteristics.

Also, a method is well known in which the hardness or fragility of the epoxy resin is improved to enhance tenacity to enhance the bending fatigue characteristics by adding a rubber modified resin or a flexibility enhancing agent. However, in this case, the heat resistance is degraded. This does not meet the required performance.

SUMMARY OF THE INVENTION

The present inventors have vigorously studied material exhibiting superior bending fatigue characteristics without sacrificing heat resistance. As a result, they have found that a matrix of a polymer alloy made of polyfunctional epoxy type resin and aromatic polycarbonate resin maintains heat resistance, withstands high temperatures caused by high speed running, and exhibits enhanced bending fatigue characteristics as a composite material for a rod of a track belt used in a snow mobile or the like.

The present invention provides a composite material that includes a polymer alloy composed of a polyfunctional epoxy type thermosetting resin and aromatic polycarbonate thermoplastic resin used as a matrix. The composite material is composed of the polymer alloy and reinforcing fiber.

The present invention also provides a composite material that includes a mixture composed of a polyfunctional epoxy type thermosetting resin, an acid anhydride type curing agent and aromatic polycarbonate thermoplastic resin used as a matrix. The composite material is composed of the mixture and reinforcing fiber.

The composite material includes 100 parts by weight polyfunctional epoxy resin, 90 to 130 parts by weight acid anhydride type curing agent and 3 to 25 parts by weight aromatic polycarbonate resin.

In the composite material, the epoxy type resin, which has a molecular weight of about 250 to 1,000 and a functional group number of about 3 to 4, is used as the polyfunctional epoxy type resin.

In the composite material, the reinforcing fiber includes at least one member selected from the group consisting of glass fiber, aramid fiber, carbon fiber and alumina fiber.

In the composite material, a glycidylamine type epoxy type resin is used as the polyfunctional epoxy type resin.

In the composite material, the acid anhydride curing agent includes alicyclic acid anhydride type curing agent obtained by mixing at least one member selected from the group consisting of methyltetrahydrophthalic anhydride, methylnadic anhydride, and hexahydrophthalic anhydride obtained through a high pressure hydrogenizing method.

According to another, the present invention provides a method for producing composite material characterized in that a mixture composed of a polyfunctional epoxy type resin, which is thermosetting resin, acid anhydride type curing agent and aromatic polycarbonate resin, which is thermoplastic resin, is used as a matrix, and the mixture and reinforcing fiber are used to form the composite material in accordance with a drawing/molding method.

In the method for producing composite material, 2-functional epoxy type resin having a functional group number of 2 and a molecular weight of about 100 to 600 is further added to the mixture.

In the method for producing composite material, alicyclic acid anhydride type curing agent, which is thermosettable by heat in the range of 100 to 250° C., is used as an acid anhydride type curing agent.

In the method for producing composite material, aromatic polycarbonate resin, which has a glass transition point of 130° C. or more and a molecular weight of about 12,000 to 80,000, is used as aromatic polycarbonate resin.

In the method for producing composite material, liquid state matrix, which has a matrix viscosity of about 100 to 15,000 mpa•s and which is cured for a short period of time in a temperature atmosphere range of 80 to 250° C., is used.

In the method for producing composite material, a volume containing ratio of reinforcing fiber in a molded article drawn/molded is adjusted to be in the range of 50 to 70% and a volume containing ratio of the matrix is adjusted to be in the range of 30 to 50%.

In the method for producing composite material, a volume containing ratio of aromatic polycarbonate resin in the matrix is adjusted to be in the range of 2 to 25%.

In the method for producing composite material, aromatic polycarbonate resin having a melting point of 220 to 240° C. is used as the aromatic polycarbonate resin.

In the composite material for a lateral rigid member of a track belt for use in a snow mobile, the article drawn/molded is used.

The present invention is characterized in that polyfunctional epoxy system resin, acid anhydride system curing agent and aromatic system polycarbonate resin are mixed together and a composite material for a rod is obtained by plastic drawing and molding.

A "matrix" according to the present invention is composed, in detail, of i) 100 parts by weight of polyfunctional epoxy system resin, ii) 90 to 130 parts by weight of acid anhydride system curing agent, and 5 to 45 parts by weight of aromatic system polycarbonate resin.

Preferably, the polyfunctional epoxy system resin used in the present invention is epoxy resin having a molecular weight of about 250 to 1,000 and a functional group number of about 3 to 4. It is not excluded to add to the mixture epoxy resin having a functional group number of 2 and a molecular weight of about 100 to 600 in order to balance a reaction rate of resin and performance of molded article during plastic drawing and molding or to adjust a viscosity of the resin.

Also, the acid anhydride system curing agent is alicyclic acid anhydride type curing agent which is kept in a liquid state at room temperature. The agent, which may be thermally hardened in the range of 100 to 250° C., is practically usable for plastic drawing and molding.

According to the present invention, the aromatic system polycarbonate resin, which enhances the bending fatigue characteristics of the composite material for the rod while keeping up the heat resistance and giving tenacity to the drawn and molded article, preferably is a resin having a glass transition point of 130° C. or more and a molecular weight of about 12,000 to 80,000.

Upon the selection of the above-described treatment, first of all, it is requisite that the matrix is moldable through a regular plastic drawing and molding method. In other words, the viscosity of the matrix within the resin impregnating tank in the plastic drawing and molding step is in the range of 100 to 15,000 mpa•sec for the liquid state. The matrix is required to rapidly be cured in an atmosphere at a temperature of 80 to 250°.

In view of this, it is preferable that the epoxy system resin is glycidylamine-type resin, which has a superior in viscosity and curing rate.

Also, regarding the curing agent obtained as alicyclic acid anhydride type curing agent through a Diels-Alder reaction, it is possible to mix and use, solely or in combination, a methyltetrahydrophthalic anhydride, which is a low viscosity liquid material, a methylnadic anhydride, and a hexahydrophthalic anhydride through a high pressure hydrogenizing method.

As resin that is molten at a temperature in the range of about 180 to 250° C., that is, a melting point at which thermoplastic resin is molten within molds during the molding process in the drawing molding method, it is possible to use phenoxy resin, polyphenylene-ether resin, polycarbonate resin, aromatic nylon resin or the like of the aromatic resin. It is, however, preferable to select aromatic polycarbonate resin which has a high Tg point in relation to heat resistance, shock proof property and tensile yield elongation coefficient, which contribute to anti-bending fatigue property.

However, in general, in a drawing molding method in which thermosetting resin is used for molding material, in view of the curing characteristics of the resin, a temperature of molds is set in the range of from 80 to 250° C., the stagnation period of time of the resin is in the range of about 5 to 300 seconds, and the resin is continuously drawn from the molds. The resin which has been cured through this process becomes a fiber reinforced plastic drawn molded article in which the resin has a three-dimensional cross-linking structure and the matrix is integrated to be insoluble and non-molten.

When the mold temperature is elevated up to 250° C. or more for molding, in case of thermosetting resin, heat of an exothermic reaction is applied to the resin. As a result, a so called baking phenomenon occurs. It is therefore difficult to obtain a satisfactory molded article.

Accordingly, in the case where the melting point of the thermoplastic resin exceeds 250° C. which is an upper limit of the mold setting temperature, the epoxy type resin and the thermoplastic resin which are base material are not dissolved with each other but are present simply as filling material. This is quite different from a sea island condition, which is based on a micro phase separation structure generated during the curing process of the resin from the intersoluble condition. This does not lead to the enhancement in tenacity of the molded article.

At the experimental level, many studies describe heating the epoxy type resin and the thermoplastic resin once and dissolving them in advance with each other by using solution which has a high dissolving power, such as methylenechloride. Thereafter, the solution is removed under reduced pressure and the resin is heated and cured to obtain the molded article. (J. B. Cho, .W. Hwang, K. Cho, J. H. An and C. E. Park, POLYMER, 1993, Volume 34, Number 23, pages 4832–4836, Yamamoto, Inoue Polymer Preprint, JAPAN Vol. 41, No. 3, 1992).

However, in the drawing molding method applied to an industrial molding production system in which a great amount of resin is used, the matrix resin to be used for molding has to be non-solvent. Also, it is extremely difficult to apply the drawing molding method to the production, although the method may be carried out at the experimental level. Also, a solution having an extremely high dissolving power, such as methylenechloride, is toxic and causes environmental pollution. It is therefore difficult to apply the solution to the industrial field.

On the other hand, it is possible to dissolve the epoxy type resin and the thermoplastic resin with each other as a matrix, which keeping a high temperature and blending these resins, for a long period of time. However, due to the high temperature environment, the maintenance of pot life under the control of the curing reaction and the characteristics of the resins make the apparatus and the method too complicated, which is not practical.

As described above, according to the present invention, the epoxy-type resin and acid anhydride-type curing agent as the curing agent for the epoxy type resin are well selected. Also, the aromatic polycarbonate resin has a melting point of about 220 to 240° C., which falls in the mold setting temperature range of 80 to 250° C., which is general in the drawing molding method specified for the application. Thus, it is unnecessary to dissolve, with the epoxy type resin, the aromatic polycarbonate resin that is the thermoplastic resin, prior to use. Accordingly, it is possible to dispense with complicated steps for heating and dissolving the resin to the solvent and evacuating and removing the solvent thereafter during the adjustment of the matrix. It is possible to use a predetermined resin group for the drawing and molding process immediately after the resin is mixed in a mixer. In addition, it is possible to obtain a fiber reinforced plastic rod composite material made of cured matrix in the form of a polymer alloy that is extremely improved in bending fatigue characteristics while maintaining the heat resistance, which is the object of the invention.

BRIEF DESCRIPTION OF THE DRAWINGS

In the accompanying drawings:

FIGS. 1-(A) and 1-(B) are tables showing characteristics of the composite material according to the present invention;

DESCRIPTION OF THE PREFERRED EMBODIMENTS

The present invention will now be explained in more detail by way of example.

An embodiment of the present invention is shown in FIGS. 6 to 10. The composite material is used for a rod 3 of a track belt 2 in a snow mobile 1. A number (about 40 to 50) of rods 3 are provided in a single track belt 2. Reference numeral 4 denotes a metal member.

In order to obtain the rod 3 (drawn and molded article) a mold having a cross section substantially in the form of a semicircular shape having a diameter of 12.8 mm, a cross-sectional area of 64.5 mm$^2$ and a length of 500 mm was prepared.

As a reinforcing fiber, 45 threads of glass lobing No. 2310 made by Nihon Electric Glass K.K. were drawn from a rack, aligned with each other and caused to pass through a cavity of the semicylindrical mold.

Panlite L1225 made by Teijin Kasei K.K. (glass transition point: about 145° C., melting point: about 230° C., specific gravity: 1.20) was prepared for thermoplastic resin, which is formed into polymer alloy with the epoxy type resin.

EXAMPLE 1

The matrix was selected as the following composition. The composition was agitated for three minutes by a mixer at a rotational speed of agitating vanes of 1,600 rpm to prepare for reinforcing fiber impregnating resin for drawing and molding. A viscosity of resin after the adjustment was 920 mpa•s (23° C.).

| <epoxy type resin> | |
|---|---|
| glycidylamine type epoxy ELM-100 (3 functional groups) made by Sumitomo Chemical Industries K.K. | 27.8 weight parts |
| diglycidyl ether bisphenol A type epoxy AER 260 (2 functional groups) made by Asahi-Ciba K.K. | 12.0 weight parts |
| <acid anhydride type curing agent> | |
| methylnadic anhydride AH 3000 made by Hitachi Kasei Kogyo K.K. | 36.7 weight parts |
| methyltetrahydrophthalic anhydride PH 5000 made by Tonen Petrochemical K.K. | 14.7 weight parts |
| <aromatic polycarbonate resin> | |
| Panlite 1225 made by Teijin Kasei K.K. | 7.9 weight parts |
| <additive> | |
| 2-ethyl-4-methylimidazole | 0.3 weight parts |
| zinc stearate | 0.6 weight parts |
| total | 100.0 weight parts |

With the above-described composition of reinforcing fiber/matrix, the mold temperature was set at 240° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C.

The characteristics of the FRP rod had a glass containing ratio of 128.5 g/m and 63.7 vol. %.

EXAMPLE 2

The matrix was selected as the following composition. In the same way as the first example, the composition was agitated for three minutes by a mixer at a rotational speed of agitating vanes of 1,600 rpm to prepare for reinforcing fiber impregnating resin for drawing and molding.

A viscosity of resin after the adjustment was 1240 mpa•s (23° C.).

| <epoxy type resin> | |
|---|---|
| glycidylamine type epoxy TETRAD C (4 functional groups) made by Mitsubishi Gas Chemical K.K. | 25.5 weight parts |
| diglycidyl ether bisphenol A type epoxy EPIKOTE828 (2 functional groups) made by Oil Chemical Shell Epoxy K.K. | 13.7 weight parts |
| <acid anhydride type curing agent> | |
| methylnadic anhydride AH 3000 made by Hitachi Kasei Kogyo K.K. | 51.7 weight parts |
| <aromatic polycarbonate resin> | |
| Panlite 1225 made by Teijin Kasei K.K. | 7.9 weight parts |
| <additive> | |
| 2-ethyl-4-methylimidazole | 0.4 weight parts |
| zinc stearate | 0.8 weight parts |
| total | 100.00 weight parts |

With the above-described composition of reinforcing fiber/matrix, the mold temperature was set at 240° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C.

The characteristics of the FRP rod had a glass containing ratio of 128.7 g/m and 63.5 vol. %.

EXAMPLE 3

The matrix was selected as the following composition. In the same way as the first example, the composition was agitated for three minutes by a mixer at a rotational speed of agitating vanes of 1,600 rpm to prepare for reinforcing fiber impregnating resin for drawing and molding.

A viscosity of resin after the adjustment was 1620 mpa•s (23° C.)

| <epoxy type resin> | |
|---|---|
| glycidylamine type epoxy YH434L (4 functional groups) made by Toto Kasei K.K. | 26.9 weight parts |
| diglycidyl ether bisphenol F type epoxy EPIKOTE807 (2 functional groups) made by Oil Chemical Shell Epoxy K.K. | 14.5 weight parts |
| <acid anhydride type curing agent> | |
| methylnadic anhydride AH 3000 made by Hitachi Kasei Kogyo K.K. | 44.5 weight parts |
| methyltetrahydrophthalic acid anhydride HN 2200 made by Hitachi Kasei Kogyo K.K. | 4.6 weight parts |
| <aromatic polycarbonate resin> | |
| Panlite 1225 made by Teijin Kasei K.K. | 8.3 weight parts |
| <additive> | |
| 2-ethyl-4-methylimidazole | 0.4 weight parts |
| zinc stearate | 0.8 weight parts |
| total | 100.0 weight parts |

With the above-described composition of reinforcing fiber/matrix, the mold temperature was set at 240° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C.

The characteristics of the FRP rod had a glass containing ratio of 129.0 g/m and 63.4 vol. %.

Comparison Examples will now be described.

In the same way as the first to third examples, in order to obtain the rod 3 of the track belt 2 in relation with the snow mobile 1, a mold having a cross section substantially in the form of a semicircular shape having a diameter of 12.8 mm, a cross-sectional area of 64.5 mm² and a length of 500 mm was prepared. As a reinforcing fiber, 45 threads of glass lobing No. 2310 made by Nihon Electric Glass K.K. were drawn from a rack, aligned with each other and caused to pass through a cavity of a semi-cylindrical mold.

The matrices for the comparison examples were prepared as follows.

A matrix having the conventional composition used in a general type snow mobile was used in Comparison Example 1.

A matrix in which any aromatic polycarbonate resin was not used in the composition of Example 2 was used in Comparison Example 2.

A matrix in which any aromatic polycarbonate resin was not used in the composition of Example 3 was used in Comparison Example 3.

A matrix in which instead of the aromatic polycarbonate resin the same amount of phenoxy resin was added in the composition of Example 3 was used in Comparison Example 4.

A matrix in which instead of the aromatic polycarbonate resin the same amount of polyether ether ketone resin was added in the composition of Example 3 was used in Comparison Example 5.

The more detailed explanation will be given.

COMPARISON EXAMPLE 1

The same kind and the same number of the reinforcing glass fibers were prepared by the same apparatus used in Examples. The matrix was selected as the following composition. The composition was .agitated for three minutes by a mixer at a rotational speed of agitating vanes of 1,600 rpm to prepare for reinforcing fiber impregnating resin for drawing and molding. A viscosity of resin after the adjustment was 640 mpa•s (23° C.

| <epoxy type resin> | |
|---|---|
| diglycidyl ether bisphenol A type epoxy AER (2 functional groups) made by Asahi-Ciba K.K. | 56.2 weight part |
| <acid anhydride type curing agent> | |
| hexahydrophthalic anhydride RIKACID HH made by Shin-Nihon Rika K.K. | 42.1 weight parts |
| <additive> | |
| 2-ethyl-4-methylimidazole | 0.6 weight parts |
| zinc stearate | 1.1 weight parts |
| total | 100.0 weight parts |

With the above-described composition of reinforcing fiber/matrix, the mold temperature was set at 170° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 140° C.

The characteristics of the FRP rod had a glass containing ratio of 128.2 g/m and 64.1 vol. %.

COMPARISON EXAMPLE 2

The adjusted resin of 1,050 mp•s (23° C.) was prepared in the same manner as Comparison Example 1.

<epoxy type resin>

| | |
|---|---|
| glycidylamine type epoxy<br>TETRAD C (4 functional groups) made by<br>Mitsubishi Gas Chemical K.K. | 25.5 weight parts |
| diglycidyl ether bisphenol A type epoxy<br>EPIKOTE828 (2 functional groups) made by<br>Oil Chemical Shell Epoxy K.K. | 13.7 weight parts |

<acid anhydride type curing agent>

| | |
|---|---|
| methylnadic anhydride<br>AH 3000 made by Hitachi Kasei Kogyo K.K. | 51.7 weight parts |

<additive>

| | |
|---|---|
| 2-ethyl-4-methylimidazole | 0.4 weight parts |
| zinc stearate | 0.8 weight parts |
| total | 92.1 weight parts |

With the above-described composition of reinforcing fiber/matrix, the mold temperature was set at 200° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C.

The characteristics of the FRP rod had a glass containing ratio of 128.4 g/m and 64.1 vol. %.

COMPARISON EXAMPLE 3

The adjusted resin of 1,370 mp•s (23° C.) was prepared in the same manner as Comparison Example 1.

<epoxy type resin>

| | |
|---|---|
| glycidylamine type epoxy<br>YH434L (4 functional groups) made by<br>Toto Kasei K.K. | 26.9 weight parts |
| diglycidyl ether bisphenol F type epoxy<br>EPIKOTE807 (2 functional groups) made by<br>Oil Chemical Shell Epoxy K.K. | 14.5 weight parts |

<acid anhydride type curing agent>

| | |
|---|---|
| methylnadic anhydride<br>AH 3000 made by Hitachi Kasei Kogyo K.K. | 44.5 weight parts |
| methyltetrahydrophthalic anhydride<br>HN 2200 made by Hitachi Kasei Kogyo K.K. | 4.6 weight parts |

<additive>

| | |
|---|---|
| 2-ethyl-4-methylimidazole | 0.4 weight parts |
| zinc stearate | 0.8 weight parts |
| total | 91.7 weight parts |

With the above-described composition of reinforcing fiber/matrix, the mold temperature was set at 200° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C. The characteristics of the FRP rod had a glass containing ratio of 128.6 g/m and 63.5 vol. %.

COMPARISON EXAMPLE 4

Phenoxy resin PKHP-200 (glass transition point: 120° C., melting point: about 210° C., specific gravity: 1.18) made by Phenoxy Associate K.K. was selected as the thermoplastic resin. The impregnating resin had a viscosity of 1,590 mpa•s (23° C.) after the adjustment was prepared in the same manner as Example 3.

<epoxy type resin>

| | |
|---|---|
| glycidylamine type epoxy<br>YH434L (4 functional groups) made by<br>Toto Kasei K.K. | 26.9 weight parts |
| diglycidyl ether bisphenol F type epoxy<br>EPIKOTE807 (2 functional groups) made by<br>Oil Chemical Shell Epoxy K.K. | 14.5 weight parts |

<acid anhydride type curing agent>

| | |
|---|---|
| methylnadic anhydride<br>AH 3000 made by Hitachi Kasei Kogyo K.K. | 44.5 weight parts |
| methyltetrahydrophthalic anhydride<br>HN 2200 made by Hitachi Kasei Kogyo K.K. | 4.6 weight parts |

<phenoxy resin>

| | |
|---|---|
| PKHP-200 made by Phenoxy Associate K.K.> | 8.3 weight parts |

<additive>

| | |
|---|---|
| 2-ethyl-4-methylimidazole | 0.4 weight parts |
| zinc stearate | 0.8 weight parts |
| total | 100.0 weight parts |

With the above-described composition of reinforcing fiber/matrix, the mold temperature was set at 240° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C.

The characteristics of the FRP rod had a glass containing ratio of 128.9 g/m and 63.5 vol. %.

COMPARISON EXAMPLE 5

Polyether ether ketone resin PEEK450 (glass transition point: 160° C., melting point: about 340° C., specific gravity: 1.30) made by Mitsui-Toatu Kagaku K.K. was selected as the thermoplastic resin. The impregnating resin having a viscosity of 1,670 mpa•s (23° C.) after the adjustment was prepared in the same manner as Example 3.

<epoxy type resin>

| | |
|---|---|
| glycidylamine type epoxy<br>YH434L (4 functional groups) made by<br>Toto Kasei K.K. | 26.9 weight parts |
| diglycidyl ether bisphenol F type epoxy<br>EPIKOTE807 (2 functional groups) made by<br>Oil Chemical Shell Epoxy K.K. | 14.5 weight parts |

<acid anhydride type curing agent>

| | |
|---|---|
| methylnadic anhydride<br>AH 3000 made by Hitachi Kasei Kogyo K.K. | 44.5 weight parts |
| methyltetrahydrophthalic anhydride<br>HN 2200 made by Hitachi Kasei Kogyo K.K. | 4.6 weight parts |

<polyether ether ketone resin>

| | |
|---|---|
| PEEK 450P made by Mitsui-Toatsu Kagaku K.K.> | 8.3 weight parts |

<additive>

| | |
|---|---|
| 2-ethyl-4-methylimidazole | 0.4 weight parts |
| zinc stearate | 0.8 weight parts |
| total | 100.0 weight parts |

With the above-described composition of reinforcing fiber/matrix, the mold temperature was set at 240° C. and the molding was carried out at a drawing/molding speed of 15 cm/min to thereby obtain an FRP rod in the form of a semicircular cross section. The obtained FRP rod was subjected to a post-curing treatment for ten hours in a constant temperature drier set at 200° C.

The characteristics of the FRP rod had a glass containing ratio of 129.0 g/m and 63.4 vol. %.

Figure 1:
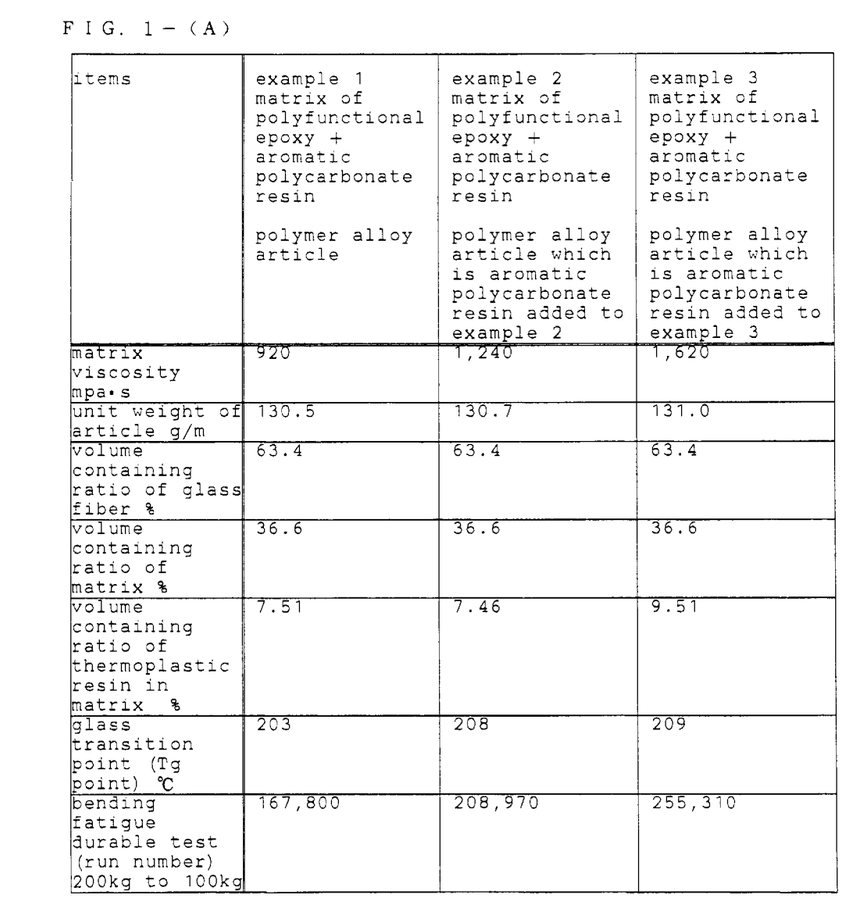

For the eight kinds of FRP rods (drawn/molded article) obtained in accordance with the above-described Examples 1 to 3 and Comparison Examples 1 to 5, the respective characteristics of the FRP rods were confirmed by experimental apparatus and measurement method to be described as follows. The results were shown in Table in FIG. 1.

<Resin Viscosity>

The resin viscosity measurement method in the above described Examples 1 to 3 and Comparison Examples 1 to 5 were essentially based upon JIS K 7117 by a B type viscometer.

<Molding Unit Weight>

For the eight kinds of rods drawn and molded in the above-described Examples 1 to 3 and Comparison Examples 1 to 5, each article was cut by 1,000 mm in a longitudinal direction, and its weight was measured by an electronic balance scale having precision of 0.01 g. The measurement value was rounded on the ⅘ basis accurate to 0.1 g.

<Volume Containing Ratio>

An amount of glass fiber to be added per 1,000 mm of each molded article was 103.95 g/m (2.31 g/m×45). The specific gravity of the glass fiber was 2.54, and the volume per 1,000 mm of the molded article was 64.5 cm (64.5 $mm^2$×1,000 mm). Based on these numerical data, the following formula was used for calculating the volume containing ratio.

The volume containing ratio of the glass fiber (%) was given as follows:

=(103.95/2.54)÷(64.5×100)=63.4 (%)

Also, in case of the matrix, it was given by the following formula:

The volume containing ratio of the matrix (%)=100−(volume containing ratio of the glass fiber)

Furthermore, the volume containing ratios of the thermoplastic resin used in Examples 1 to 3 and Comparison Examples 4 and 5 were given as follows:

A volume of the matrix per 1,000 mm of the molded article is:

64.5 cm×(1−0.634)=23.61 cm

The volume containing ratio (%) occupied in the matrix of the thermoplastic resin:

={(unit weight of the article−103.95)×(amount of added thermoplastic resin (%))}÷specific weight of used thermoplastic resin÷23.61×100

<Tg point (glass transition temperature)>

The sample which was about 0.5 mm thick, 1.5 mm wide and 70.0 mm long was cut out of each of the eight kinds of the molded articles in the fibrous direction. By using a visicoelasticity metering device RD-1100AD made by Rhesca Co., the cut sample was held at both ends each by 10 mm with a chucking distance of 50 mm at a temperature elevating rate of 5° C./min.

<Bending Strength>

The sample was cut by 150 mm in the longitudinal length of the rods out of each of the eight kinds of molded articles. By using Autograph AG-10TB made by K.K. Shimazu Seisaku-sho, the measurement was carried out at three bending points of the actual articles. The support point interval was 100 mm. The shapes of the pressing member and the support member were essentially based upon JIS K7055. Also, the high temperature measurement at 200° C. was carried out after each sample was held up for 30 minutes in the same ambient atmosphere.

Also, the stress loading direction was such that each flat side of a semicircular cross section was applied to a support point and the pressure member was imposed thereon in the circumferential direction.

<Bending Fatigue Characteristics>

The sample was cut by 200 mm in the longitudinal direction of each rod out of the eight kinds of articles. By using a bending fatigue tester made by Mori Tekkoh K.K., the fatigue test was repeatedly carried out at four points of each rod. The two end support interval was fixed to 150 mm, and the stress loading pressure interval was 60 mm. The repeated load was in the range of 0 to 200 kg at the start point. The cyclic number was 5 Hz. The load imposing direction of the pressure member was effected from the flat side.

The ending point of the measurement was at the time the maximum load was lowered to 100 kg by the reduction of the stress load caused by the repetitive bending fatigue and the repetitive number of the measurement was represented.

Also, a fragmental surface of each article according to this test was photographed by SEM S-2300 made by K.K. Hitachi Seisaku-sho. The typical examples thereof are shown in FIGS. 2 and 3 which are pictorial views of photos taken by SEM.

Figure 2:
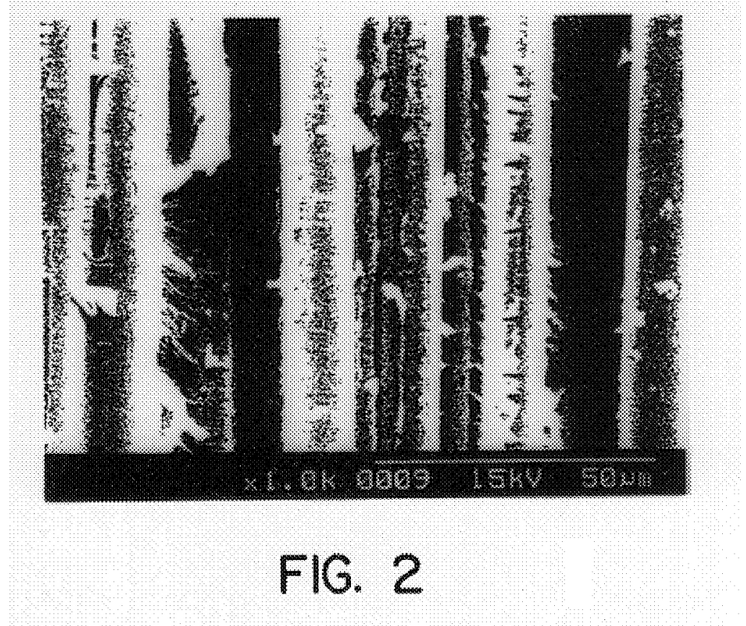
FIG. 2 is an illustration of a condition of a fracture surface of a molded article according to Comparison Example 3 photographed by SEM.

FIG. 2 shows Comparison Example 3 in which the matrix was not formed into a polymer alloy. FIG. 3 shows Example 3 in which the matrix was formed into a polymer alloy.

Figure 3:
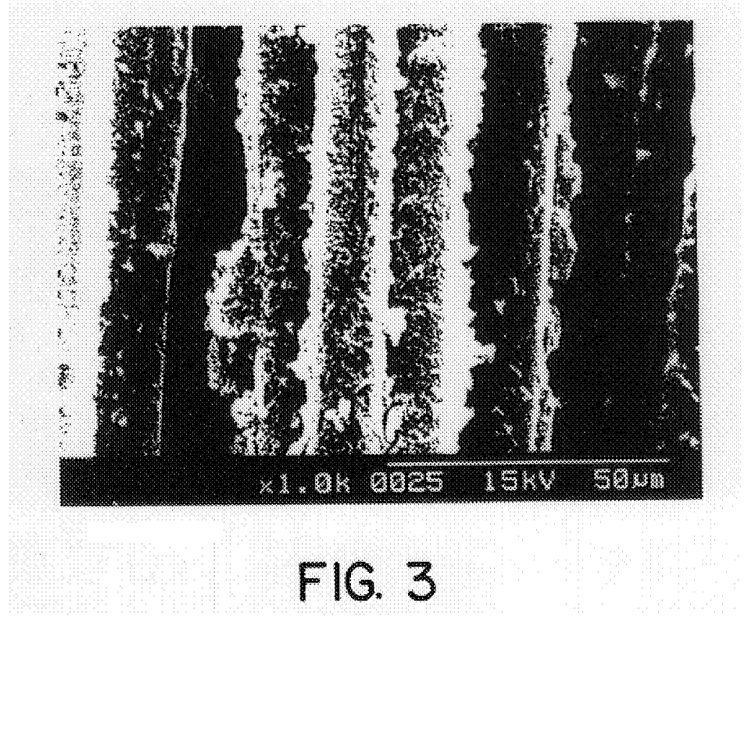
FIG. 3 is an illustration of a condition of a fracture surface of a molded article according to Example 3 photographed by SEM.

As is apparent from FIG. 3, in the case where a matrix formed into a polymer alloy was used, a large amount of the resin was cured and adhered to the surface of the glass filament.

On the other hand, in the case where the matrix which was not formed into a polymer alloy was used (FIG. 2), the resin adhesion to the glass filament layer hardly occurred and the filament surface layer was exposed. Accordingly, it was confirmed that the formation of the polymer alloy enhanced the toughness, that is, the effect of the bending fatigue durability.

Figure 4:
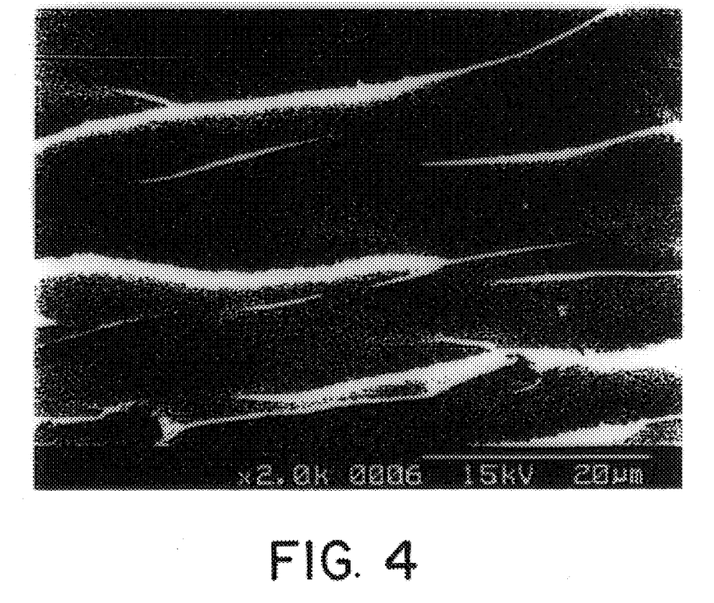
FIG. 4 is an illustration of a condition of a shock fracture cross section of a cast molded plate composed only of a matrix in accordance with Comparison Example 3 photographed by SEM.
Figure 5:
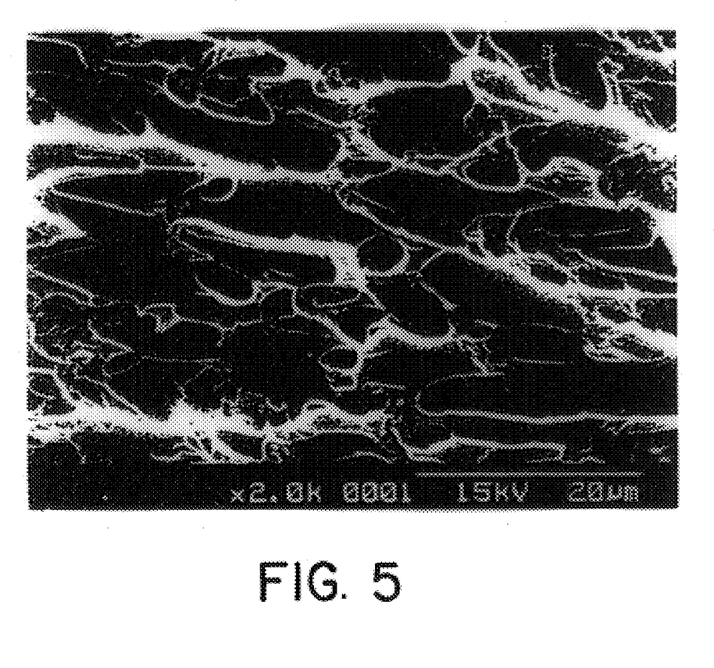
FIG. 5 is an illustration of a condition of a shock fracture cross section of a cast molded plate composed only of a matrix in accordance with Example 3 photographed by SEM.
Figure 6:
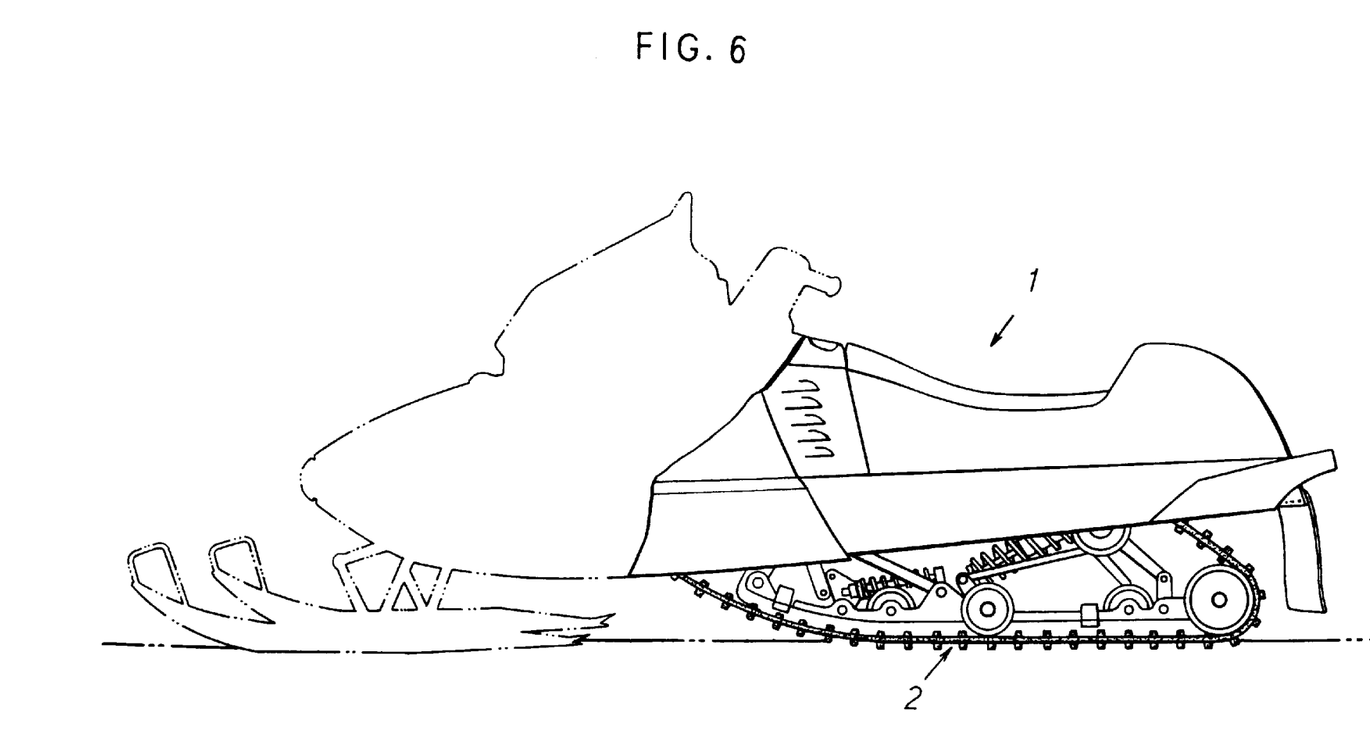
FIG. 6 is a front view of a snow mobile according to the present invention.
Figure 7:
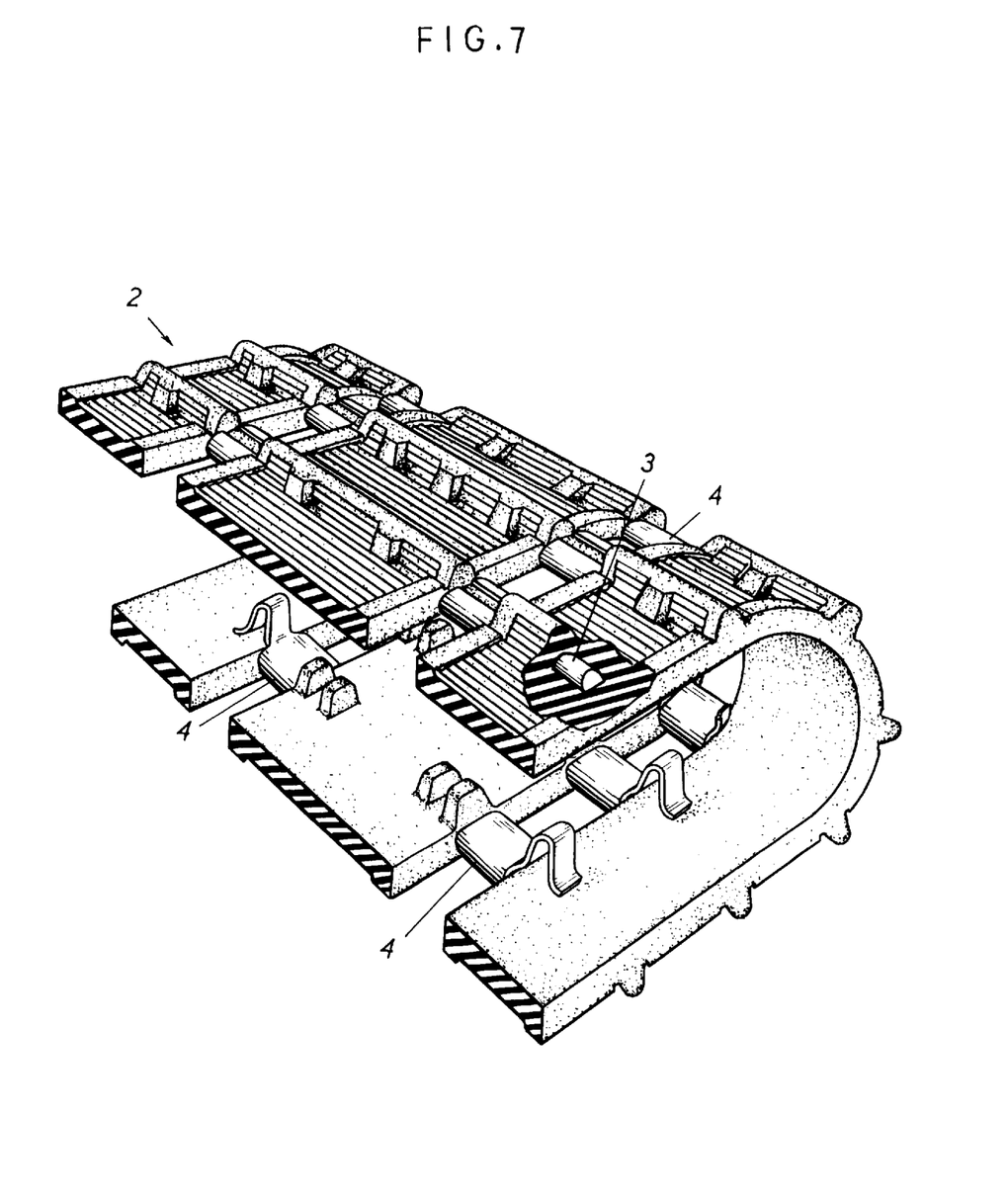
FIG. 7 is a perspective view of rods of a track belt of the snow mobile.
Figure 8:
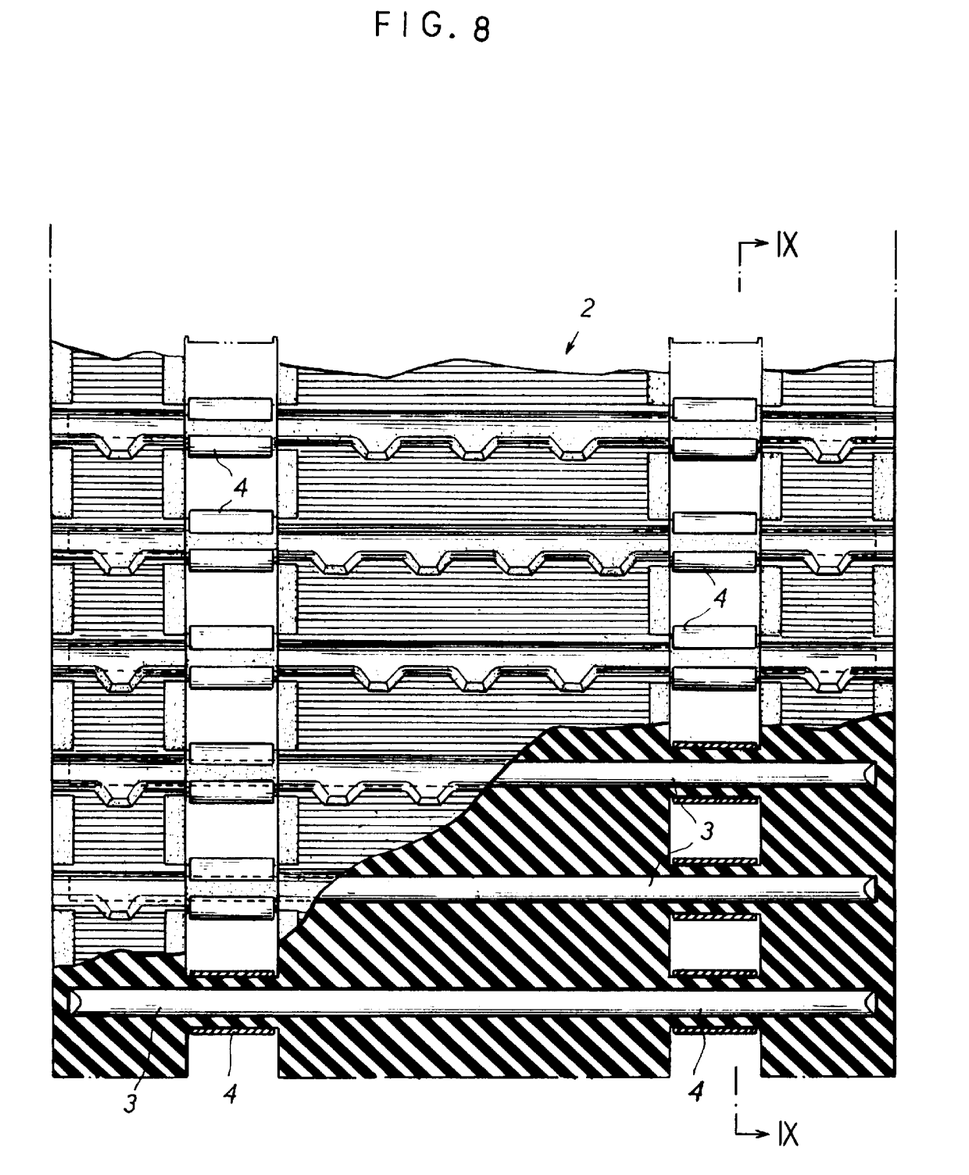
FIG. 8 is a plan sectional view showing the rods of a track belt of the snow mobile.
Figure 9:
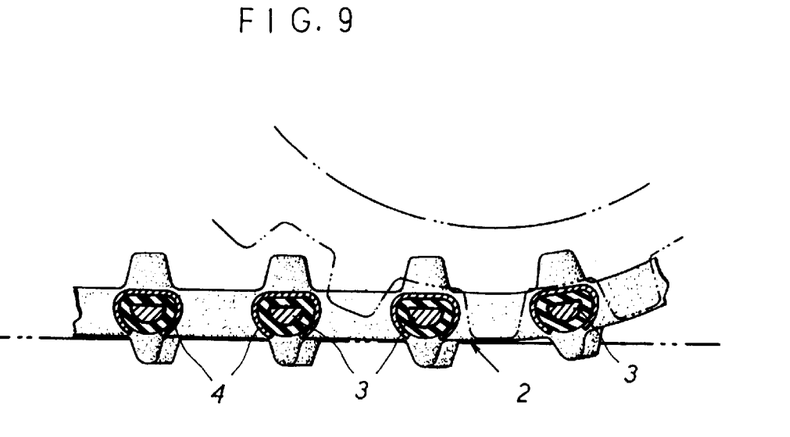
FIG. 9 is a side elevational sectional view showing the rods of a track belt of the snow mobile taken along the line IX—IX of FIG. 8.
Figure 10:
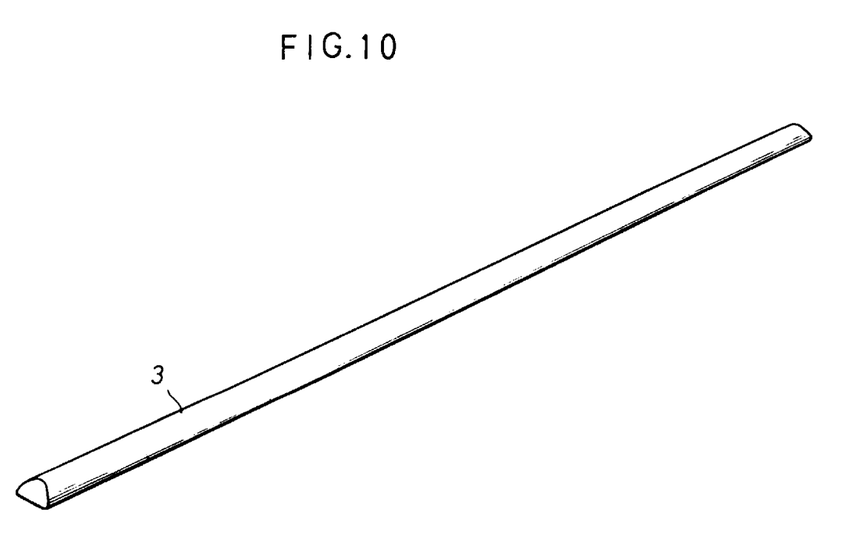
FIG. 10 is an a perspective view showing the rods of the track belt.

Furthermore, the cast molded plate composed only of the matrix was produced, and its shock fracture surface was photographed by SEM (FIGS. 4 and 5 are pictures of photos by SEM). FIG. 4 shows a hardened matrix in Comparison Example 3 and FIG. 5 shows a hardened matrix formed into a polymer alloy in Example 3.

In FIG. 4, cracks run in parallel in the direction of shock fracture. In FIG. 5, the fracture surface is formed into scales to enhance the toughness.

As described above, the molded article according to the present invention is highly improved in bending fatigue durability without sacrificing heat resistance as a rod material of a track belt for a snow mobile and, hence, may be applied to a high speed tendency of the snow mobile. Then, the rod may be subjected to a regular drawing/molding method without using complicated apparatus and work and without any toxic or dangerous chemicals. Accordingly, it is possible to produce the rods on the mass production basis.

As described above, in the composite material according to the present invention, a mixture of a polyfunctional epoxy type resin and an aromatic polycarbonate resin is used as a matrix. Accordingly, without sacrificing the heat resistance, it is possible to provide a composite material that exhibits a highly improved bending fatigue durability. Also, the mixture is used so that it is unnecessary to use complicated apparatus or work for the composite material. A regular or normal drawing/molding method may be used without using dangerous chemicals. Accordingly, the composite material may be produced on the mass-production basis.

Various details of the invention may be changed without departing from its spirit or its scope. Furthermore, the foregoing description of the embodiments according to the present invention is provided for the purpose of illustration only, and not for the purpose of limiting the invention as defined by the appended claims and their equivalents.

What we claim is:

1. A composite material for a lateral rigid member of a track belt for use in a snowmobile, comprising:

a glycidylamine epoxy resin that is a polyfunctional epoxy thermosetting resin and has a molecular weight of about 250 to 1000, included in an amount of 100 parts by weight;

a 2-functional epoxy resin having a molecular weight of about 100 to 600, included in an amount of 12 to 14.5 parts by weight;

an aromatic polycarbonate thermoplastic resin having a molecular weight of about 12000 to 80000, a glass transition point of 130° C. or more, a melting point of 220° C. to 240° C. and included in an amount of 5 to 45 parts by weight;

an acid anhydride curing agent included in an amount of 90 to 130 parts by weight; and reinforcing fiber.

2. The composite material according to claim 1, wherein the reinforcing fiber includes at least one member selected from the group consisting of glass fiber, aramid fiber, carbon fiber and alumina fiber.

3. The composite material according to claim 1, wherein the acid anhydride curing agent is an alicyclic acid anhydride curing agent including at least one member selected from the group consisting of methyltetrahydrophthalic anhydride, methylnadic anhydride, and hexahydrophthalic anhydride.

4. The composite material according to claim 2, wherein the acid anhydride curing agent is an alicyclic acid anhydride curing agent includes at least one member selected from the group consisting of methyltetrahydrophthalic anhydride, methylnadic anhydride, and hexahydrophthalic anhydride.

5. A method for producing composite material for a lateral rigid member of a track belt for use in a snowmobile, said method comprising the steps of:

combining 100 parts by weight of a polyfunctional epoxy thermosetting resin having a molecular weight of about 250 to 1000, 12 to 14.5 parts by weight of a 2-functional epoxy resin having a molecular weight of about 100 to 600, 5 to 45 parts by weight of an aromatic polycarbonate thermoplastic resin having a molecular weight of about 12000 to 80000, a glass transition point of 130° C. or more and a melting point of 220° C. to 240° C., and 90 to 130 parts by weight of an alicyclic acid anhydride curing agent to form a matrix having a viscosity of about 100 to 15000 mpa•s;

curing said matrix and a reinforcing fiber through a drawing mold, a temperature of said mold being from 80° C. to 250° C.; and adjusting a volume containing ratio of reinforcing fiber in a molded article to be in the range of 50 to 70%.

6. The method for producing composite material according to claim 5, wherein the polyfunctional epoxy thermosetting resin includes an epoxy resin having a functional group number of about 3 to 4.

7. The method for producing composite material according to claim 5, wherein the reinforcing fiber includes at least one member selected from the group consisting of glass fiber, aramid fiber, carbon fiber, and alumina fiber.

8. The method for producing composite material according to claim 6, wherein the reinforcing fiber includes at least one member selected from the group consisting of glass fiber, aramid fiber, carbon fiber, and alumina fiber.

9. The method for producing composite material according to claim 5, wherein the alicyclic acid anhydride curing agent is thermosettable by heat in the range of 100° C. to 250° C., said alicyclic acid anhydride curing agent includes at least one member selected from the group consisting of methyltetrahydrophthalic anhydride, methylnadic anhydride, hexahydrophthalic anhydride.

10. The method for producing composite material according to claim 6, wherein the alicyclic acid anhydride curing agent is thermosettable by heat in the range of 100° C. to 250° C., said alicyclic acid anhydride curing agent includes at least one member selected from the group consisting of methyltetrahydrophthalic anhydride, methylnadic anhydride, hexahydrophthalic anhydride.

11. The method for producing composite material according to claim 7, wherein the alicyclic acid anhydride curing agent is thermosettable by heat in the range of 100° C. to 250° C., said alicyclic acid anhydride curing agent includes at least one member selected from the group consisting of methyltetrahydrophthalic anhydride, methylnadic anhydride, hexahydrophthalic anhydride.

12. The method for producing composite material according to claim 8, wherein the alicyclic acid anhydride curing agent is thermosettable by heat in the range of 100° C. to 250° C., said alicyclic acid anhydride curing agent includes at least one member selected from the group consisting of methyltetrahydrophthalic anhydride, methylnadic anhydride, hexahydrophthalic anhydride.

13. The method for producing composite material according to claim 5, wherein a volume containing ratio of aromatic polycarbonate resin in the matrix is adjusted to be in the range of 2 to 25%.

* * * * *

UNITED STATES PATENT AND TRADEMARK OFFICE
CERTIFICATE OF CORRECTION

PATENT NO. : 5,952,435
DATED : September 14, 1999
INVENTOR(S) : Fumio Chiba et al.

It is certified that error appears in the above-indentified patent and that said Letters Patent is hereby corrected as shown below:

On the title page,
Item [73] Assignee should read:
-- The Yokohama Rubber Co., Ltd., Tokyo, Japan
and Arisawa Mfg. Co., Ltd., Joetsu, Japan---

Signed and Sealed this

Tenth Day of April, 2001

Attest:

NICHOLAS P. GODICI

Attesting Officer

Acting Director of the United States Patent and Trademark Office